Patented Nov. 25, 1941

2,264,150

UNITED STATES PATENT OFFICE 2,264,150

METHOD FOR THE PREPARATION OF AQUEOUS SOLUTIONS OF SUBSTANCES INSOLUBLE OR DIFFICULTLY SOLUBLE IN WATER

Richard Hueter, Dessau-Rosslau, Anhalt, and Richard Neu, Dessau, Anhalt, Germany, assignors, by mesne assignments, to "Patchem" A.-G. zur Beteiligung an Patenten und Sonstigen Erfindungsrechten auf Chemische Verfahren, Zurich, Switzerland, a corporation of Switzerland No Drawing. Application February 4, 1938, Serial No. 188,696. In Germany February 4, 1937

10 Claims. (Cl. 167—31)

For the preparation of aqueous solutions of substances insoluble or difficultly soluble and of a medicinal, antiseptic or pharmacological action we generally avail ourselves of soaps or soaplike-acting substances. Those solutions, however, possess the undesirable quality of supplying in many instances solutions which, especially when hard water is used, are neither clear nor long-lasting, while their efficiency gradually diminishes.

Now it has been found that such kation-active substances of soaplike properties containing higher molecular alkyl groups and derived from unsaturated, weak, cyclic bases are excellent dissolving-media for the materials characterized above and particularly for phenols, phenol-derivatives, camphor, rotenone, menthol, pyrethrines, vegetable extracts and the like. Among quaternary ammonium compounds suitable for such purpose are e. g. the alkyl-pyridinium-hydroxides, the similar compounds of the quinoline, isoquinoline, pyrrole, aniline etc., as well as their salts, halogenides, sulfates, nitrates, acetates etc. By the term "higher molecular alkyl groups" all those alkyl groups are meant, the carboxyl-derivatives of which show soaplike properties when in the form of their alkali metal salts.

Furthermore it has been found that the substances employed according to the present invention as dissolving-media which in themselves exert a remarkable bacteria-destroying effect, can be combined with disinfecting agents and particularly with those of the phenol-type, without losing or reducing their efficiency. On the contrary, their disinfecting or pharmacological power becomes fully evident so that combination-products will result which combine the special effect e. g. of the phenols with the effect of the quaternary ammonium-bases resulting in a mixture having an enhanced efficiency.

Compared with the combination-products of soap or Turkey-red oils and phenols, the present novel combinations possess a particular advantage when hard water is used. The novel combinations cause no turbidities nor any precipitations, nor do they have any weakening effect upon the phenols. Furthermore, the ratio of solution-transferrer to the phenol or phenol-derivative respectively can be modified within high limits.

Example 1

A phenol-mixture consisting of 1.8 g. of chloroxylenol, 1.8 g. of p-chloro-m-cresol, 1.0 g. of chloro-thymol and 1.6 g. of chloro-carvacrol together with 20.0 g. of alkyl-pyridinium-chloride wherein the alkyl-residue corresponds to the alkyl-residues of the fatty acids contained in cocoa-oil, and 8 g. of alcohol gives upon dilution with water up to 100 g., a mother-solution dilutable with water to any extent.

Diluted with water to the ratio of 1:10000 this solution is capable of killing staphylococcus aureus within 2½ minutes and bacterium coli within 30 minutes if diluted to the ratio of 1:3000, whereas a 20%-solution of the alkyl-pyperidinium-chloride without the addition of phenols must be diluted to the ratio of 1:5000 in order to obtain within 2½ minutes the perfect destruction of staphylococcus aureus and the killing of bacterium coli is only attained in 30 minutes with a dilution of 1:500. This means that the effect in applying simultaneously the phenols is doubled and even sextupled respectively.

Example 2

6.2 g. of p-chloro-m-cresol, 14.0 g. of alkyl-pyridinium-chloride (obtained by the alkylation of pyridine with a technical alkyl-chloride-mixture, the latter obtained by the conversion of alcohols resulting from the reduction of cocoa-oil, with hydrochloric acid), 8.0 g. of alcohol and 71.8 g. of water, give a clear solution which can be diluted to any extent by distilled water and also by water of 40° of hardness. Those aqueous diluted mixtures remain stable even after leaving them as they are for several days.

The disinfecting power of this solution is shown by the following experiments:

(a) Staphylococcus aureus in broth: the entire destruction will be attained within half a minute upon using the mother-solution diluted of 1:1000.

(b) Bacterium coli: the destruction occurs within 4 minutes upon using the mother-solution diluted of 1:100, and within 1 minute upon diluting of 1:400.

Instead of alkyl-pyridinium-chloride we may likewise apply with a similar effect alkyl-quinolinium-sulfate, alkyl-dimethyl-phenyl-ammonium-bromide. By substituting—in the above example—the chloro-m-xylenol for p-chloro-m-cresol, we obtain with an aqueous dilution of 1:1000 of the mother-solution the complete destruction of the staphylococcus aureus as well as killing of the bacterium coli already within half a minute.

*Example 3*

A solution of camphor is obtained by mixing 15 g. of camphor, 62 g. of lauryl-quinolinium-chloride, 56 g. of distilled water and 67 g. of alcohol. This mother-solution can be diluted with nine times the amount of water, without turning turbid or separating. The aqueous camphor-solution is suitable for external application in a similar manner to the well known camphorated spirits.

The higher molecular hydrocarbon residues, especially alkyl residues, of the quaternary ammonium compounds used according to the prescribed method contain at least six carbon atoms such as the hexyl-, octyl-, decyl-, cetyl-, stearyl-, oleyl-, ricinoleyl-, cyclohexyl-, alkylcyclohexyl-, benzyl-, tetrahydronaphthyl-, decahydronaphthyl-, naphthenyl-, abietyl-residues and the like. These residues may also be interrupted by heteroatoms or heteroatom groups such as oxygen, sulfur, nitrogen and known atom groups containing these atoms.

We claim:

1. The method for producing clear aqueous solutions of phenolic substances insoluble or difficultly soluble in water having a disinfectant, antiseptic or pharmacological action characterized by admixing these substances in an aqueous liquid with quaternary ammonium compounds derived from weak cyclic bases and having at least one higher molecular hydrocarbon residue on the nitrogen atom, said phenolic substance being present in the solution in an amount which in the absence of the quaternary ammonium compound would not produce a clear solution, and said quaternary ammonium compounds being present in a quantity which produces clear aqueous solutions when diluted in preparation for use.

2. The process of simultaneously increasing the water solubility of disinfectants of the phenol-type and enhancing their disinfectant efficiency which comprises incorporating in the mixture of water and a phenolic disinfectant a quaternary ammonium compound derived from a weak cyclic organic base and having at least one higher molecular hydrocarbon radical joined to the nitrogen atom, said quaternary ammonium compound being employed in a quantity sufficient to, and which effects the formation of a clear dilute solution from the mixture which in the absence of the quaternary ammonium compound would not be a clear solution.

3. The method of producing clear aqueous solutons of disinfectants of the phenol type which comprises admixing the disinfectants in an aqueous liquid in a proportion which produces cloudy solutions, with a quaternary ammonium compound derived from a weak cyclic organic base and having at least one aliphatic radical of at least 6 carbon atoms joined to the nitrogen atom, the quantity of quaternary ammonium compound employed being greater than the weight of the distinfectant used and sufficient to produce a clear aqueous solution when diluted with water in preparation for use.

4. The method of producing clear aqueous solutions containing conventional substantially water-insoluble organic substances for the destruction of small organisms which comprises, incorporating into aqueous dispersions of said substances a quaternary ammonium compound derived from a weak cyclic base and having at least one higher molecular hydrocarbon radical on the nitrogen atom, said substance being present in the resulting solution in a quantity which in the absence of said compound would not form a clear solution, and said compound being present in a quantity in excess of said substance and sufficient to produce a clear dilute solution ready for use.

5. The method of producing clear aqueous solutions of conventional substantially water-insoluble antiseptic and pharmacological substances consisting of oxy-substituted cyclic hydrocarbons which comprises, incorporating into aqueous dispersions of said substances a quaternary ammonium compound derived from a weak cyclic base and having at least one higher molecular hydrocarbon radical selected from the group consisting of alkyl-pyridinium hydroxides, alkyl-quinolinium hydroxides, alkyl-isoquinolinium hydroxides, di-alkyl-pyrrolinium hydroxides, tri-alkyl-analinium hydroxides, and hydrochloric-, sulfuric-, nitric- and acetic acid salts of these bases, said substances being present in the resulting solution in a quantity which in the absence of said compound would not form a clear solution, and said compounds being present in a quantity in excess of said substance and sufficient to produce a clear dilute solution ready for use.

6. A clear aqueous solution containing a disinfectant of the phenol type together with a quaternary ammonium compound derived from a weak cyclic base and having at least one higher molecular hydrocarbon radical on the nitrogen atom, said disinfectant being present in the solution in a proportion which in the absence of said quaternary ammonium compound would not form a clear solution in the water, and said quaternary ammonium compound being present in a proportion which provides a clear solution in a dilute form ready for use.

7. A clear aqueous solution containing a phenol and at least one quaternary ammonium compound derived from weak cyclic bases and having at least one higher molecular hydrocarbon radical on the nitrogen atom, said phenol being present in the solution in an amount which in the absence of the quaternary ammonium compound would not produce a clear solution, and said quaternary ammonium compound being present in a quantity in excess of that of the phenol and sufficient to render said solution in a clear form upon dilution with water in preparation for use of the solution.

8. A clear aqueous solution containing a phenol and an alkyl-pyridinium chloride, said alkyl group having at least 6 carbon atoms, said phenol being present in the solution in an amount which in the absence of the quaternary ammonium compound would not produce a clear solution, and said chloride being present in an amount which is in excess of said phenol and which provides a clear solution upon dilution with water to prepare the solution for use.

9. A clear aqueous solution containing a phenol mixture and a mixture of alkyl-pyridinium chlorides having alkyl radicals corresponding to the fatty acid radicals contained in cocoanut oil, said phenols being present in the solution in an amount which in the absence of the chlorides would not produce a clear solution, and said chlorides being present in a quantity greater than that of the phenol mixture, which quantity is sufficient to maintain a clear dilute aqueous solution.

10. A clear aqueous solution containing a phenol mixture consisting of chloro-xylenol, p-chloro-m-cresol, chloro-thymol and chloro-carvacrol and an alkyl-pyridinium chloride, the alkyl group having at least 6 carbon atoms, said phenol mixture being present in the solution in an amount which in the absence of said chloride mixture would not produce a clear solution, and said chloride being present in an amount in excess of said phenolic mixture, which amount maintains said solution in a clear condition upon dilution with water for use.

RICHARD HUETER.
RICHARD NEU.

CERTIFICATE OF CORRECTION.

Patent No. 2,264,150. November 25, 1941.

RICHARD HUETER, ET AL.

It is hereby certified that error appears in the printed specification of the above numbered patent requiring correction as follows: Page 1, second column, line 45, for "1:100" read --1:1000--; and that the said Letters Patent should be read with this correction therein that the same may conform to the record of the case in the Patent Office.

Signed and sealed this 28th day of April, A. D. 1942.

(Seal)

Henry Van Arsdale,
Acting Commissioner of Patents.